(12) United States Patent
Yoshida et al.

(10) Patent No.: US 10,046,652 B2
(45) Date of Patent: Aug. 14, 2018

(54) CHARGE CONTROL APPARATUS, MOVABLE BODY, AND CHARGE CONTROL METHOD

(71) Applicants: Masaaki Yoshida, Kanagawa (JP); Hideo Yanagita, Tokyo (JP)

(72) Inventors: Masaaki Yoshida, Kanagawa (JP); Hideo Yanagita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 164 days.

(21) Appl. No.: 15/135,721

(22) Filed: Apr. 22, 2016

(65) Prior Publication Data
US 2016/0325633 A1 Nov. 10, 2016

(30) Foreign Application Priority Data

May 7, 2015 (JP) .................................. 2015-094655
Mar. 7, 2016 (JP) .................................. 2016-043719

(51) Int. Cl.
*H02J 7/00* (2006.01)
*B60L 11/18* (2006.01)
*B60W 20/13* (2016.01)
*B60W 50/08* (2012.01)

(52) U.S. Cl.
CPC ....... *B60L 11/1809* (2013.01); *B60L 11/1861* (2013.01); *B60W 20/13* (2016.01); *B60W 50/082* (2013.01); *B60W 2540/04* (2013.01); *Y10S 903/903* (2013.01)

(58) Field of Classification Search
USPC ....................................................... 320/132
See application file for complete search history.

(56) References Cited

U.S. PATENT DOCUMENTS

| 7,202,635 | B2* | 4/2007 | Patino ..................... | H02J 7/008 |
| | | | | 320/160 |
| 7,737,659 | B2 | 6/2010 | Morioka | |
| 9,054,551 | B2* | 6/2015 | Bak ......................... | H02J 7/042 |
| 2004/0222768 | A1* | 11/2004 | Moore ................. | H02J 7/0075 |
| | | | | 320/128 |
| 2005/0134231 | A1* | 6/2005 | Cho ....................... | H02J 7/0093 |
| | | | | 320/141 |
| 2005/0206348 | A1* | 9/2005 | Tsuchiya ............... | H01M 10/44 |
| | | | | 320/156 |

(Continued)

FOREIGN PATENT DOCUMENTS

JP 2008-005644 1/2008

*Primary Examiner* — Samuel Berhanu
(74) *Attorney, Agent, or Firm* — IPUSA, PLLC (57) ABSTRACT

A charge control apparatus includes a battery having a first maximum value, a minimum value, and a second maximum value of an output density, in an output characteristic indicating a relationship between a remaining capacity and the output density of the battery, the minimum value being on a lower remaining capacity side than the first maximum value and the second maximum value being on a lower remaining capacity side than the minimum value; and a charge control unit configured to stop charging the battery when a voltage of the battery reaches a charge termination voltage set in a predetermined setting range. The predetermined setting range is from a voltage corresponding to a remaining capacity associated with the first maximum value to a full charge voltage.

6 Claims, 7 Drawing Sheets

(56) References Cited

U.S. PATENT DOCUMENTS

| | | | |
|---|---|---|---|
| 2008/0007223 A1* | 1/2008 | Morioka | H02J 7/0081 |
| | | | 320/128 |
| 2012/0200257 A1* | 8/2012 | Schwarz | H01M 10/42 |
| | | | 320/109 |
| 2013/0069584 A1* | 3/2013 | Nagakura | H02J 7/0086 |
| | | | 320/107 |
| 2014/0183954 A1 | 7/2014 | Yoshida et al. | |
| 2015/0073614 A1 | 3/2015 | Yoshida et al. | |
| 2016/0294021 A1* | 10/2016 | Ueno | H01M 10/443 |

* cited by examiner

| VOLTAGE [V] | SOC [%] |
|---|---|
| 4.20 | 100 |
| 4.10 | 95 |
| ⋮ | ⋮ |
| ⋮ | ⋮ |
| 4.00 | 80 |
| 4.00 | 75 |
| 3.90 | 70 |
| ⋮ | ⋮ |
| ⋮ | ⋮ |
| ⋮ | ⋮ |

| TEMPERATURE [°C] | SOC [%] | CHARGE TERMINATION VOLTAGE [V] |
|---|---|---|
| 0~10 | 100 | 4.20 |
| 11~20 | 100 | 4.20 |
| 21~30 | 95 | 4.10 |
| 31~40 | 90 | 4.00 |
| 41~50 | 90 | 4.00 |

| TEMPERATURE [°C] | SOC [%] | CHARGE TERMINATION VOLTAGE [V] |
|---|---|---|
| 0~10 | 95 | 4.10 |
| 11~20 | 95 | 4.10 |
| 21~30 | 90 | 4.00 |
| 31~40 | 85 | 3.95 |
| 41~50 | 80 | 3.90 |

CHARGE CONTROL APPARATUS, MOVABLE BODY, AND CHARGE CONTROL METHOD

BACKGROUND OF THE INVENTION

1. Field of the Invention

The present invention relates to a charge control apparatus of a battery, a movable body, and a charge control method.

2. Description of the Related Art

In recent years, electric vehicles, hybrid vehicles, etc., using secondary batteries such as lithium-ion batteries, nickel hydride batteries, etc., are known.

Furthermore, it is known that the degree of deterioration of a secondary battery increases if the secondary battery is maintained in a fully charged state. Techniques for avoiding the deterioration of secondary batteries are conventionally known. Specifically, for example, there is known a technique of reducing the voltage setting for charging the battery, as charging and discharging of the battery are repeated.

However, in the above conventional techniques, as the remaining capacity of the battery decreases, the output from the battery (output power) also decreases.

Patent Document 1: Japanese Laid-Open Patent Publication No. 2008-5644

SUMMARY OF THE INVENTION

The present invention provides a charge control apparatus of a battery, a movable body, and a charge control method, in which one or more of the above-described disadvantages are eliminated.

According to an aspect of the present invention, there is provided a charge control apparatus including a battery having a first maximum value, a minimum value, and a second maximum value of an output density, in an output characteristic indicating a relationship between a remaining capacity and the output density of the battery, the minimum value being on a lower remaining capacity side than the first maximum value and the second maximum value being on a lower remaining capacity side than the minimum value; and a charge control unit configured to stop charging the battery when a voltage of the battery reaches a charge termination voltage set in a predetermined setting range, wherein the predetermined setting range is from a voltage corresponding to a remaining capacity associated with the first maximum value to a full charge voltage.

According to an aspect of the present invention, there is provided a charge control method of a battery having a first maximum value, a minimum value, and a second maximum value of an output density, in an output characteristic indicating a relationship between a remaining capacity and the output density of the battery, the minimum value being on a lower remaining capacity side than the first maximum value and the second maximum value being on a lower remaining capacity side than the minimum value, the charge control method including setting a charge termination voltage of the battery in a range between a voltage corresponding to a remaining capacity associated with the first maximum value and a full charge voltage; and stopping charging the battery when a voltage of the battery reaches the charge termination voltage.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following embodiments, a description is given of an output characteristic indicating the relationship between the remaining capacity and the output density of a secondary battery, which has two maximum values of the output density. When two maximum values are referred to as first and second maximum values, the first maximum value is higher than the second maximum value, and the remaining capacity associated with the first maximum value is a higher value than the remaining capacity associated with the second maximum value. Details of the output characteristic of a secondary battery according to the present embodiment are described below.

Figure 1:
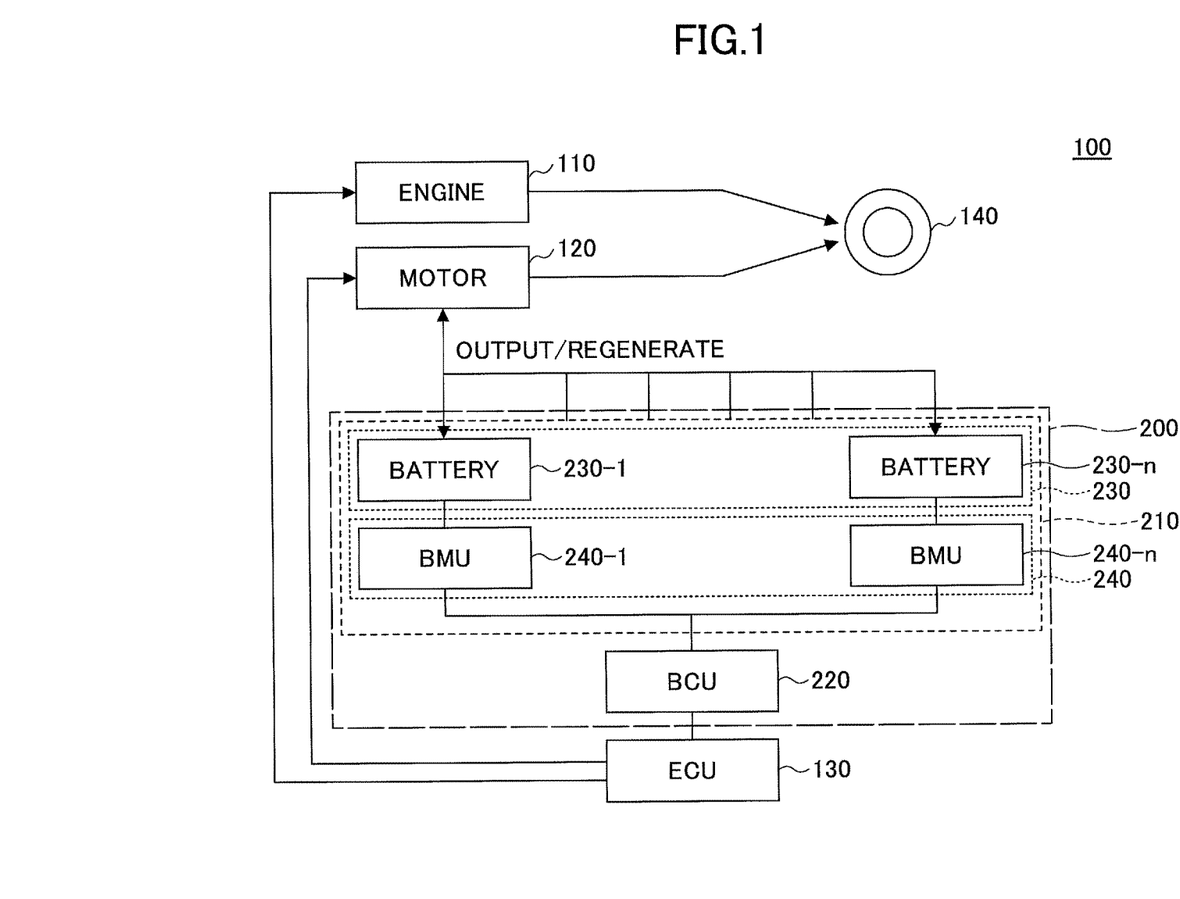
FIG. 1 illustrates an outline of a configuration of a movable body according to an embodiment.

Embodiments of the present invention will be described with reference to the accompanying drawings. FIG. 1 illustrates an outline of a configuration of a movable body according to the present embodiment.

A movable body 100 according to the present embodiment includes an engine 110, a motor 120, an ECU (Electric Control Unit) 130, a rotating body 140, and a charge control apparatus 200. The movable body 100 according to the present embodiment is, for example, a HEV (Hybrid Electric Vehicle), a PHEV (Plug-in Hybrid Electric Vehicle), etc.

The engine 110 is a known internal combustion engine that uses gasoline, diesel oil, etc., as fuel. The motor 120 is a known generator motor that functions as an electric motor and a power generator.

The ECU 130 is a computer (microcomputer) that comprehensively controls the engine 110, the engine 110, a BCU 220, etc. Specifically, the control implemented by the ECU 130 according to the present embodiment includes, for example, control of the motor 120, brake control, etc.

The rotating body 140 according to the present embodiment is, for example, a driving shaft of a tire of the movable body. In the present embodiment, the movable body 100 is caused to travel by rotating the rotating body 140 by the engine 110 and/or the motor 120.

The charge control apparatus 200 according to the present embodiment includes a battery pack 210 and a BCU (Battery Control Unit) 220.

The battery pack 210 according to the present embodiment includes a battery 230 and a BMU (Battery Monitoring Unit) 240.

The battery 230 according to the present embodiment is a secondary battery that can be charged and discharged. As the batteries 230 according to the present embodiment, n number of batteries are connected, from a battery 230-1 through a battery 230-n. In the following description, when the batteries 230-1 through 230-n are not particularly distinguished, the batteries are simply referred to as a battery 230. Note that in the present embodiment, a plurality of batteries 230 are included; however, the present embodiment is not so limited. There may be only a single battery 230.

The battery 230 according to the present embodiment has a role of supplying power when the motor 120 functions as an electric motor, and has a role of storing power generated by a regenerative brake when the motor 120 functions as a power generator.

Furthermore, in the present embodiment, when the movable body 100 is a PHEV, an external power source plug is provided. The battery 230 according to the present embodiment is charged by the power supplied from a commercial power source, by plugging the external power source plug into a receptacle. Furthermore, each of the batteries 230-1 through 230-n according to the present embodiment is provided with a thermocouple.

As the BMU 240 according to the present, n number of BMUs 240-1 through 240-n corresponding to the batteries 230-1 through 230-n are connected. In the following description, when the BMUs 240-1 through 240-n are not particularly distinguished, the BMUs are simply referred to as a BMU 240. Note that in the present embodiment, a plurality of BMUs 240 are included; however, the present embodiment is not so limited. There may be only a single BMU 240.

The BMU 240 according to the present embodiment has a function of monitoring the state of the battery 230. The BMU 240 includes, for example, a voltage sensor, a current sensor, etc., and may detect the voltage of the battery 230. Furthermore, the BMU 240 may acquire the temperature of the battery 230 from the thermocouple provided to the battery 230.

The BCU 220 acquires the voltage, the temperature, etc., of the battery 230 from the BMU 240, and controls the charging and discharging of the battery 230. Furthermore, the BCU 220 according to the present embodiment sets a charge termination voltage that is a threshold voltage used when stopping charging the battery 230.

Figure 2:
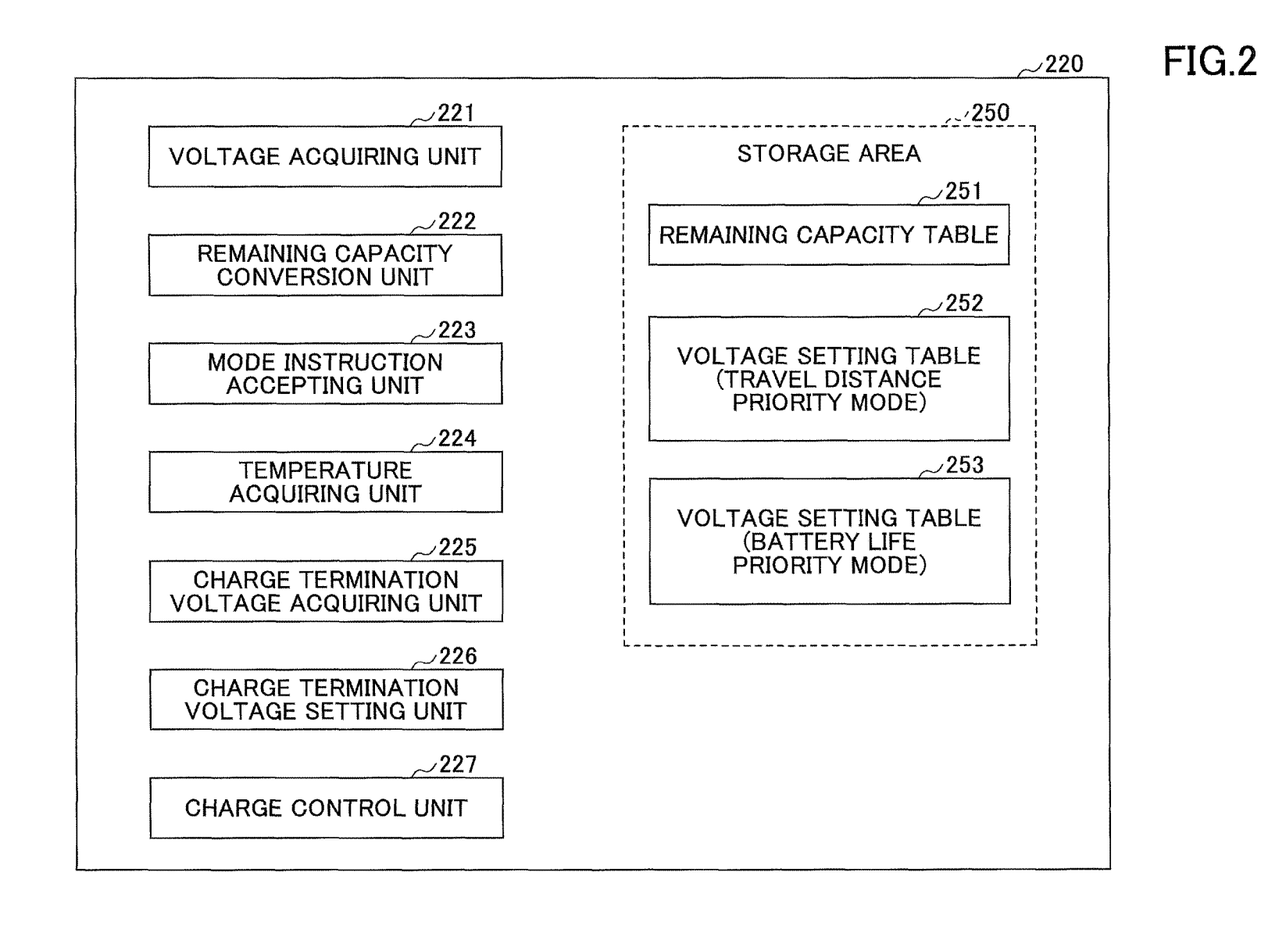
FIG. 2 illustrates a functional configuration of a BCU.

Next, with reference to FIG. 2, a description is given of the BCU 220 according to the present embodiment. FIG. 2 illustrates a functional configuration of the BCU 220.

The BCU 220 according to the present embodiment includes a voltage acquiring unit 221, a remaining capacity conversion unit 222, a mode instruction accepting unit 223, a temperature acquiring unit 224, a charge termination voltage acquiring unit 225, a charge termination voltage setting unit 226, and a charge control unit 227.

Furthermore, the BCU 220 according to the present embodiment includes a storage area 250. The storage area 250 includes a remaining capacity table 251, a voltage setting table 252, and a voltage setting table 253.

In the BCU 220 according to the present embodiment, for example, the storage area 250 may be provided in a predetermined area in a ROM (Read-Only Memory), a RAM (Random Access Memory), etc., included in the BCU 220. Furthermore, the functions of the units of the BCU 220 according to the present embodiment are realized as the BCU 220 executes programs stored in, for example, a ROM, etc.

The voltage acquiring unit 221 according to the present embodiment acquires the voltage of the battery 230 by the BMU 240. Specifically, the voltage acquiring unit 221 may acquire the voltages of the batteries 230-1 through 230-n via the BMUs 240-1 through 240-n, respectively. Furthermore, the voltage acquiring unit 221 according to the present embodiment may calculate an average value from the respective voltages of the batteries 230-1 through 230-n, and acquire this average value as the voltage of the battery 230. Furthermore, the voltage acquiring unit 221 according to the present embodiment may acquire the respective voltages of the batteries 230-1 through 230-n, add these voltages together to obtain a total value, and acquire the total value as the voltage of the battery 230. Furthermore, the voltage acquiring unit 221 according to the present embodiment may acquire the lowest voltage among the voltages of the batteries 230-1 through 230-n, as the voltage of the battery 230.

In the following description, it is assumed that the voltage acquiring unit 221 acquires the average value of the respective voltages of the batteries 230-1 through 230-n.

The remaining capacity conversion unit 222 according to the present embodiment refers to the remaining capacity table 251, and converts the voltage acquired by the voltage acquiring unit 221 into the remaining capacity of the battery 230. The remaining capacity according to the present embodiment is indicated by the SOC (State of Charge). The SOC is a value expressing the ratio of the amount of the electricity that has been charged, with respect to the rated electricity amount of the battery 230.

The mode instruction accepting unit 223 accepts input of an instruction of a mode, when setting the charge termination voltage of the battery 230. Details of the mode according to the present embodiment are described below.

The temperature acquiring unit 224 acquires the temperature of the battery 230. Specifically, the temperature acquiring unit 224 may acquire the temperatures of the batteries 230-1 through 230-n via the BMUs 240-1 through 240-n, respectively. Furthermore, the temperature acquiring unit 224 according to the present embodiment may calculate an average value from the respective temperatures of the batteries 230-1 through 230-n, and acquire this average value as the temperature of the battery 230. Furthermore, the temperature acquiring unit 224 according to the present embodiment may acquire the lowest temperature among the temperatures of the batteries 230-1 through 230-n, as the temperature of the battery 230.

In the following description, it is assumed that the temperature acquiring unit 224 acquires the average value of the respective temperatures of the batteries 230-1 through 230-n.

The charge termination voltage acquiring unit 225 refers to the voltage setting table 252 or 253 according to the mode accepted by the mode instruction accepting unit 223, and acquires a voltage associated with the temperature acquired by the temperature acquiring unit 224.

The charge termination voltage setting unit 226 sets the voltage acquired by the charge termination voltage acquiring unit 225, as the charge termination voltage.

The charge control unit 227 implements charge control with respect to the battery 230. The charge control unit 227 according to the present embodiment stops the charging when the voltage of the battery 230 reaches the charge termination voltage, both in the case where, for example, power is supplied from a commercial power source, and in the case where power generated by the regenerative brake is supplied, when charging the battery 230.

That is, in the present embodiment, the charge termination voltage is changed according to the mode accepted by the mode instruction accepting unit 223. In the following, a description is given of a mode according to the present embodiment.

The mode accepted by the mode instruction accepting unit 223 includes a travel distance priority mode and a battery life priority mode.

The travel distance priority mode is a mode of prioritizing the increase in the travelling distance of the movable body 100 only by the power supplied by the battery 230. In the travel distance priority mode, the power of the battery 230 is used as much as possible, and therefore when charging the battery 230, the charge termination voltage is set to be a value close to full charged.

The battery life priority mode is a mode of prioritizing the extension of the life of the battery 230 by suppressing the deterioration of the battery 230. In the battery life priority mode, in order to suppress the deterioration of the battery 230, the charge termination voltage is set to be a lower value than the full charge voltage when charging the battery 230.

In the following description, the travel distance priority mode is referred to as a first charging mode and the battery life priority mode is referred to as a second charging mode. In the present embodiment, the charge termination voltage of the second charging mode is set to be less than or equal to the charge termination voltage in the first charging mode.

Figure 3:
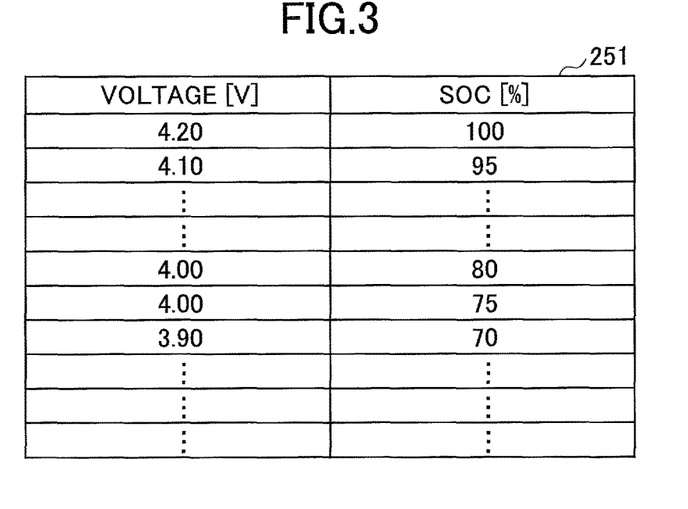
FIG. 3 illustrates an example of a remaining capacity table.
Figure 4:
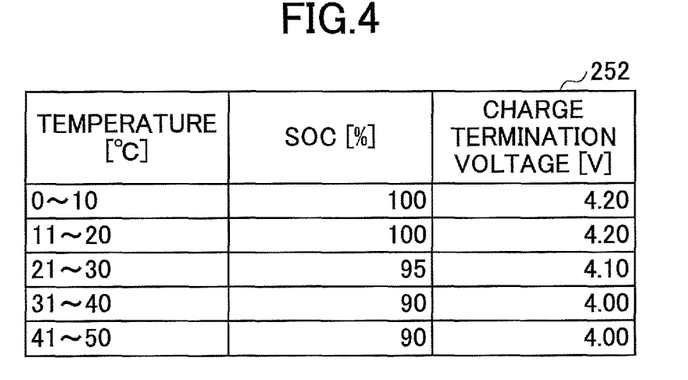
FIG. 4 illustrates an example of a voltage setting table.
Figure 5:
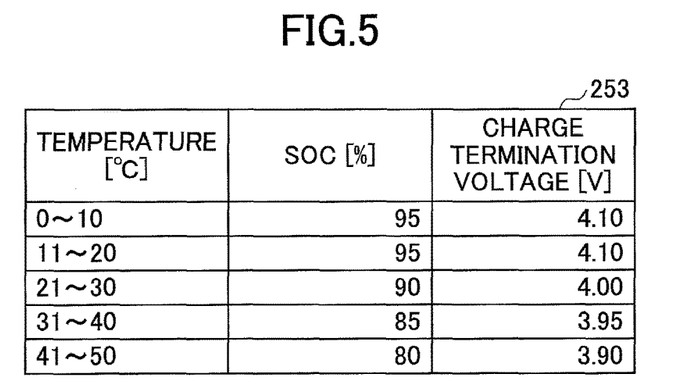
FIG. 5 illustrates another example of the voltage setting table.

Next, with reference to FIGS. 3 through 5, a description is given of the tables stored in the storage area 250.

FIG. 3 illustrates an example of the remaining capacity table 251. The remaining capacity table 251 according to the present embodiment includes information indicating the relationship between the voltage and the remaining capacity of the battery 230. The remaining capacity table 251 according to the present embodiment includes voltage and SOC as information items. The value of the item "voltage" indicates the voltage of the battery 230. The value of the item "SOC" indicates the SOC. In the remaining capacity table 251, the value of the item "voltage" and the value of the item "SOC" are associated with each other.

Note that in the present embodiment, the information indicating the relationship between the voltage and the remaining capacity of the battery 230 is included in the remaining capacity table 251; however, the information indicating the relationship between the voltage and the remaining capacity of the battery 230 may not be indicated in a table. For example, the information indicating the relationship between the voltage and the remaining capacity of the battery 230 may be expressed by a formula, etc., indicating the relationship between the voltage and the remaining capacity of the battery 230.

Note that in the present embodiment, only a single remaining capacity table 251 is indicated; however, the charge control apparatus 200 may include a plurality of remaining capacity tables 251 corresponding to different ranges of temperatures. For example, the remaining capacity table 251 illustrated in FIG. 3 may be a table of a case where the temperature acquired by the temperature acquiring unit 224 is 11° C. through 20° C.

FIG. 4 illustrates an example of the voltage setting table 252. The voltage setting table 252 illustrated in FIG. 4 is a table that is referred to when the first charging mode (travel distance priority mode) is specified.

The voltage setting table 252 according to the present embodiment includes temperature, SOC, and charge termination voltage, as information items. The value of the item "temperature" indicates the temperature of the thermocouple that is provided, for example, inside or on the package surface of the battery 230. The value of the item "SOC" is the SOC converted from the charge termination voltage, when the voltage of the battery 230 becomes the charge termination voltage. The value of the item "charge termination voltage" is the charge termination voltage that is set in association with the temperature.

FIG. 5 illustrates another example of the voltage setting table. The voltage setting table 253 illustrated in FIG. 5 is referred to when the second charging mode (battery life priority mode) is specified.

The information items included in the voltage setting table 253 are the same as those of the voltage setting table 252 illustrated in FIG. 4, and therefore descriptions are omitted.

As can be understood from FIGS. 4 and 5, in the present embodiment, a lower charge termination voltage is set as the temperature increases and a higher charge termination voltage is set as the temperature decreases.

For example, in FIG. 4, when the temperature is 41° C. through 50° C., the charge termination voltage is 4.00 V, and when the temperature is 0° C. through 10° C., the charge termination voltage is 4.20 V. Similarly, in FIG. 5, when the temperature is 41° C. through 50° C., the charge termination voltage is 3.90 V, and when the temperature is 0° C. through 10° C., the charge termination voltage is 4.10 V.

These settings are made because the battery 230 has a characteristic in that the deterioration proceeds as the temperature increases, and the discharging performance decreases and the output decreases as the temperature decreases.

Furthermore, in the present embodiment, in the voltage setting table 252 that is referred to in the first charging mode, the charge termination voltage is 4.00 V when the temperature is 31° C. through 40° C., whereas in the voltage setting table 253 that is referred to in the second charging mode, the charge termination voltage is 3.95 V when the temperature is 31° C. through 40° C.

Similarly, in the voltage setting table 252, the charge termination voltage is 4.00 V when the temperature is 41° C. through 50° C., whereas in the voltage setting table 253, the charge termination voltage is 3.90 V when the temperature is 41° C. through 50° C.

As described above, in the present embodiment, in the second charging mode in which the life of the battery 230 is prioritized, the charge termination voltage is set to be less than or equal to the charge termination voltage of the first charging mode, and therefore the deterioration of the battery 230 can be suppressed and the life of the battery 230 can be extended.

Incidentally, the charge termination voltages in the voltage setting tables 252, 253 according to the present embodiment are values that are set in advance.

In the present embodiment, the charge termination voltage is set to be in a range where the SOC of the battery 230 is greater than or equal to the remaining capacity associated with a first maximum value, among two maximum values of the output density in the output characteristic of the battery 230.

In the following, a description is given of the output characteristic of the battery 230 according to the present embodiment.

Figure 6:
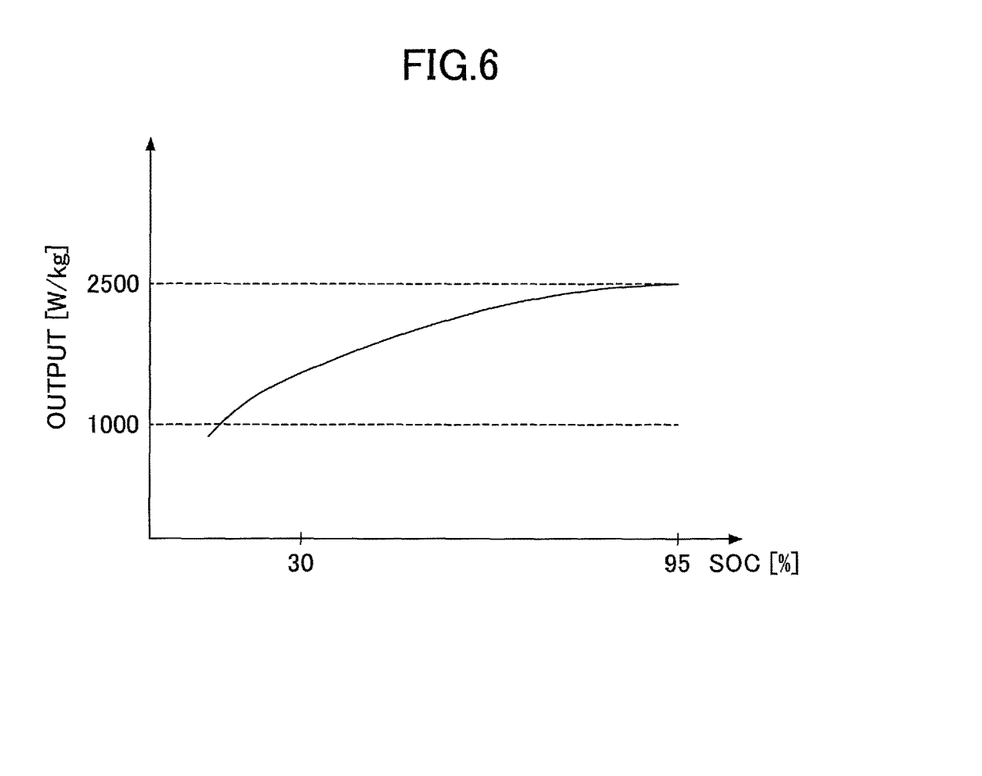
FIG. 6 illustrates the output characteristic of a general lithium-ion battery.
Figure 7:
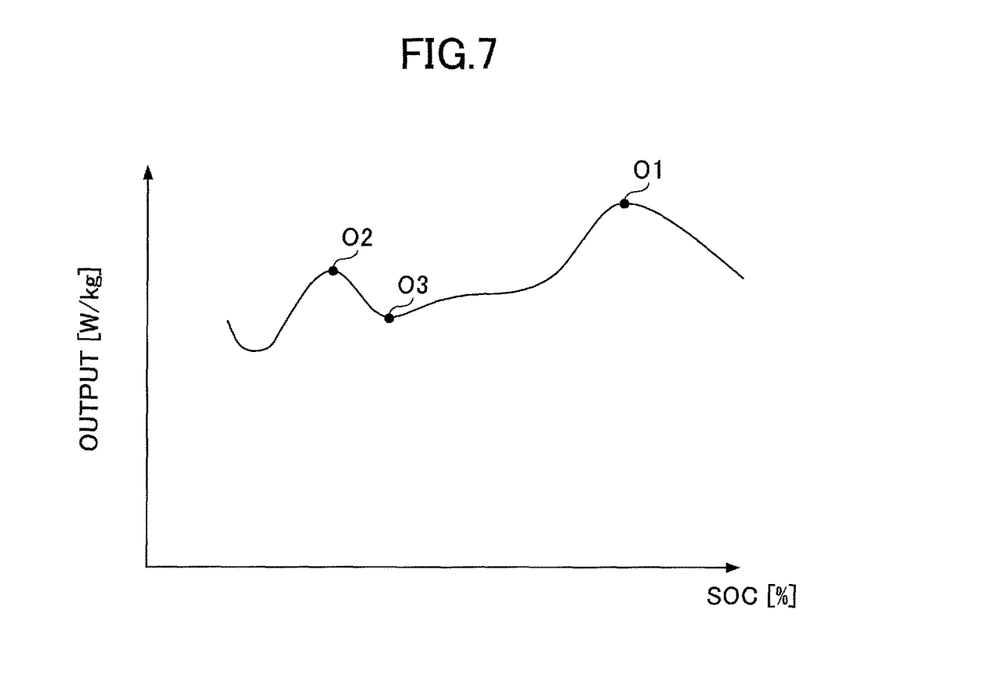
FIG. 7 illustrates the output characteristic of a battery according to an embodiment.

FIG. 6 illustrates the output characteristic of a general lithium-ion battery, and FIG. 7 illustrates the output characteristic of the battery according to the present embodiment.

In FIGS. 6 and 7, the vertical axis indicates the output density per unit mass, and the horizontal axis indicates the SOC. The output density per unit mass expresses the power that can be extracted from each unit mass of the battery. In the following description, the output density per unit mass is simply referred to as the output.

As illustrated in FIG. 6, the general lithium-ion battery has a monotonically decreasing characteristic in which the output increases as the value of the SOC increases and the output decreases as the value of the SOC decreases.

Meanwhile, in the battery 230 according to the present embodiment illustrated in FIG. 7, there are two maximum values O1, O2, and a minimum value O3, as the output values.

For example, a maximum value according to the present embodiment is a value of a function f(x) at the point where the value changes from increasing to decreasing, when the relationship between the output and the SOC of the battery 230 is expressed by a continuous function f(x). Furthermore, a minimum value according to the present embodiment is a value of the function f(x) at the point where the value changes from decreasing to increasing.

In the output characteristic of the battery 230 according to the present embodiment, the value of the SOC associated with the maximum value O1 is greater than the value of the SOC associated with the minimum value O3, and the value of the SOC associated with the minimum value O3 is greater than the value of the SOC associated with the maximum value O2. In the present embodiment, the value of the SOC associated with the maximum value O2 is approximately 30%.

That is, the battery 230 according to the present embodiment has an output characteristic in which the output becomes the maximum value O2, even in a range where the SOC is low.

Therefore, in the battery 230 according to the present embodiment, even when the SOC decreases, it is possible to supply higher output than that of a general lithium-ion battery, and in the power required for driving the movable body 100, the ratio covered by the engine 110 can be reduced. Therefore, in the present embodiment, it is possible to reduce the fuel consumption of the movable body 100. Note that the fuel consumption is the travelling distance per unit capacity of fuel, or an index indicating how much fuel is needed for travelling a predetermined distance.

In order to make the battery 230 according to the present embodiment have the output characteristic illustrated in FIG. 7, for example, an electrode in which a material having a different output characteristic with respect to the battery voltage is mixed, is to be used as the positive electrode of the battery 230. A specific example of the battery 230 is a lithium-ion battery using a positive electrode formed by mixing lithium vanadium phosphate having $Li_3V_2(PO_4)_3$ as the basic skeleton or an analogous compound formed by modifying part of the structure of the lithium vanadium phosphate (hereinafter, "lithium vanadium phosphate"), with a ternary material (nickel, cobalt, aluminum, etc.). It is difficult to increase (for example, greater than or equal to 100 Wh/kg) the capacity (energy density) by lithium vanadium phosphate alone; however, lithium vanadium phosphate is an advantageous material in terms of increasing the output. Furthermore, the ternary material is an advantageous material in terms of increasing the capacity (energy density). Note that as the material of the negative electrode, for example, graphite, etc., may be used.

Figure 8:
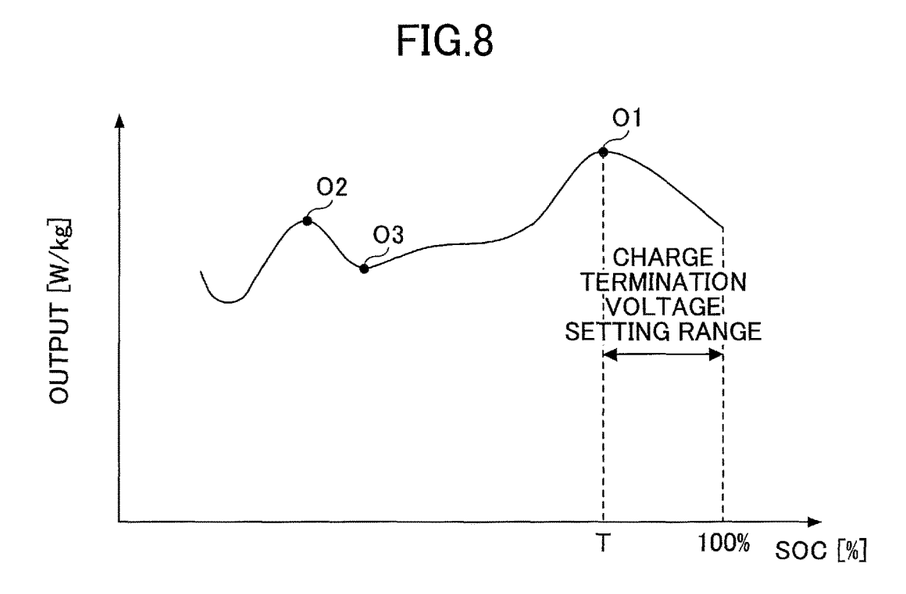
FIG. 8 is for describing the setting of a charge termination voltage.

Next, with reference to FIG. 8, a description is given of the setting of the charge termination voltage according to the present embodiment. FIG. 8 is for describing the setting of the charge termination voltage.

In the present embodiment, the charge termination voltage is set in a range where the remaining capacity of the battery 230 is greater than or equal to a SOC value T associated with the maximum value O1 in the output characteristic of the battery 230.

In other words, in the present embodiment, the voltage setting tables 252, 253 have been created such that the SOC value associated with the lowest charge termination voltage is greater than or equal to the value T, in both of the voltage setting tables 252, 253.

A case where the charge termination voltage is lowest in both of the voltage setting tables 252, 253 is a case where the temperature is highest in the voltage setting table 253 that is referred to in the second charging mode. The voltage setting tables 252, 253 according to the present embodiment are created such that the SOC value in this case is greater than or equal to the value T. That is, in the present embodiment, when the value T is 80%, the SOC value associated with the temperature 41° C. through 50° C. in the voltage setting table 253 is 80%, and the charge termination voltage becomes 3.90 V which is associated with SOC 80%.

As described above, in the present embodiment, the range from the voltage converted from the SOC value T associated with the maximum value O1 to full change, is the setting range of the charge termination voltage. Accordingly, in the present embodiment, it is possible to prevent a situation where the output of the battery 230 decreases when the charge termination voltage is set at a low value in the setting range.

For example, in the present embodiment, a case where the lowest charge termination voltage in the setting range has been set. The lowest charge termination voltage in the setting range is a voltage that is converted from the lowest SOC value T.

In this case, the output when voltage of the battery 230 is the charge termination voltage, is greater than the output when the battery 230 is fully charged.

Furthermore, in the present embodiment, the output in the setting range is lowest when the charge termination voltage is full charge. Furthermore, in the present embodiment, as the charge termination voltage is decreased (as the value of SOC is decreased), the output increases.

Therefore, in the battery 230 according to the present embodiment, it is possible to attain a higher output by setting a low charge termination voltage within the setting range of the charge termination voltage.

That is, in the present embodiment, by setting a low charge termination voltage within the setting range of the charge termination voltage, it is possible to attain a higher output from the battery 230 compared to when the battery 230 is fully charged, and the deterioration of the battery 230 can be suppressed without decreasing the output.

Figure 9:
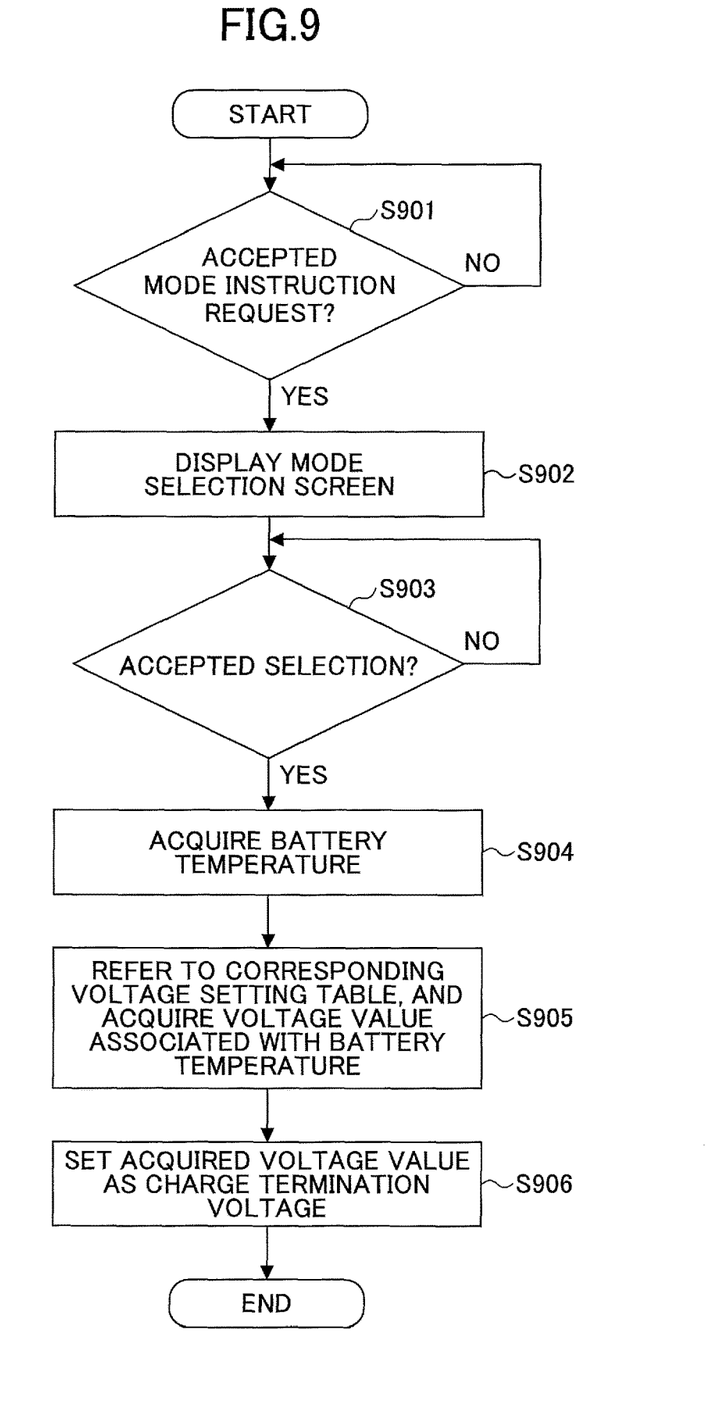
FIG. 9 is a flowchart of operations of a charge control apparatus.
Figure 10:
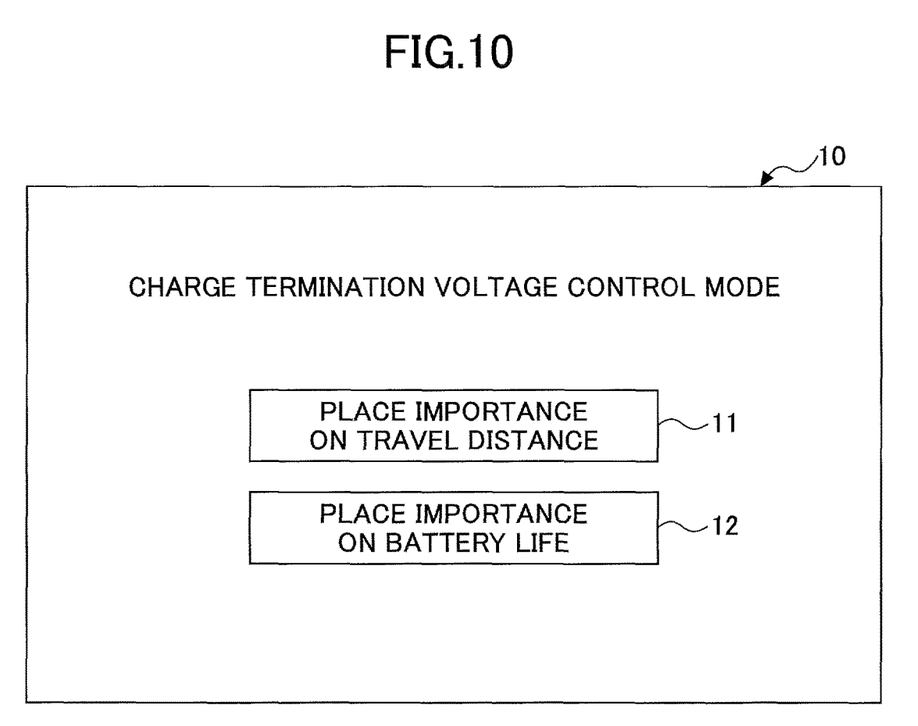
FIG. 10 illustrates an example of a mode selection screen.

Next, with reference to FIGS. 9 and 10, a description is given of operations of the charge control apparatus 200 according to the present embodiment. FIG. 9 is a flowchart of operations of the charge control apparatus 200.

The charge control apparatus 200 according to the present embodiment determines whether a mode instruction request has been accepted by the mode instruction accepting unit 223 (step S901). In step S901, when a mode instruction request is not accepted, the charge control apparatus 200 waits until a mode instruction request is accepted.

In step S901, when a mode instruction request is accepted, the mode instruction accepting unit 223 displays a mode selection screen (step S902). For example, the charge control apparatus 200 according to the present embodiment may generate screen data of the mode selection screen and output the screen data to an in-vehicle electronic device, etc., installed in the movable body 100, and display the mode selection screen on the in-vehicle electronic device, etc. Furthermore, the charge control apparatus 200 according to the present embodiment includes a display function such as a display, etc., and the mode selection screen may be displayed by this display function. Details of the mode selection screen are described below.

Next, the charge control apparatus 200 determines whether a selection of a mode in the mode selection screen has been accepted by the mode instruction accepting unit 223 (step S903).

In step S903, when a selection of a mode is not accepted, the charge control apparatus 200 waits until a selection of a mode is accepted.

In step S903, when a selection of a mode is accepted, the charge control apparatus 200 acquires the battery temperature of the battery 230 by the temperature acquiring unit 224 via the BMU 240 (step S904). Next, the charge control apparatus 200 acquires, by the charge termination voltage acquiring unit 225, the value of the charge termination voltage associated with the battery temperature acquired in step S904, upon referring to the voltage setting table 252 or the voltage setting table 253 corresponding to the mode selected at step S903 (step S905). Next, the charge control apparatus 200 sets the value of the acquired charge termination voltage as the charge termination voltage to be used when implementing charge control by the charge control unit 227, and ends the process (step S906).

FIG. 10 illustrates an example of a mode selection screen. In a mode selection screen 10 illustrated in FIG. 10, a button 11 for selecting the first charging mode (travel distance priority mode) and a button 12 for selecting a second charging mode (battery life priority mode) are displayed.

In the mode selection screen 10 according to the present embodiment, as illustrated in FIG. 10, the button 11 and the button 12 may be displayed such that the driver of the movable body 100 can recognize that when the button 11 is selected, the increase in the travelling distance only by the power of the battery 230 is prioritized, and when the button 12 is selected, suppressing the deterioration of the battery 230 is prioritized.

In the charge control apparatus 200 according to the present embodiment, for example, when a selection (touching or pressing) of the button 11 is accepted, it is determined that the first charging mode is selected. Furthermore, in the charge control apparatus 200, when a selection of the button 12 is accepted, it is determined that the second charging mode is selected.

As described above, according to the present embodiment, it is possible to suppress the deterioration of the battery 230 by setting the charge termination voltage in accordance with the temperature of the battery 230. Furthermore, according to the present embodiment, it is possible to further suppress the deterioration of the battery 230, when the driver of the movable body 100 selects the second charging mode of prioritizing the life of the battery 230.

According to one embodiment of the present invention, a charge control apparatus of a battery, a movable body, and a charge control method are provided, which are capable of suppressing the deterioration of a battery without decreasing the output.

The charge control apparatus of a battery, the movable body, and the charge control method are not limited to the specific embodiments described herein, and variations and modifications may be made without departing from the spirit and scope of the present invention.

The present application is based on and claims the benefit of priority of Japanese Priority Patent Application No. 2015-094655, filed on May 7, 2015 and Japanese Priority Patent Application No. 2016-043719, filed on Mar. 7, 2016, the entire contents of which are hereby incorporated herein by reference.

What is claimed is:

1. A charge control apparatus comprising:
a battery having a first maximum value, a minimum value, and a second maximum value of an output density, in an output characteristic indicating a relationship between state of charge and the output density of the battery, the minimum value corresponding to a first state of charge that is lower than a second state of charge corresponding to the first maximum value, and the second maximum value corresponding to a third state of charge that is lower than the first state of charge to which the minimum value corresponds; wherein each state of charge expresses a ratio of an amount of charged electricity to a rated electricity amount of the battery; and
a charge control unit configured to stop charging the battery when a voltage of the battery reaches a charge termination voltage set in a predetermined setting range, wherein
the predetermined setting range is from a voltage corresponding to the second state of charge associated with the first maximum value to a full charge voltage;
wherein a material of an electrode of the battery includes a lithium vanadium phosphate having $Li_3V_2(PO_4)_3$ as a basic skeleton or an analogous compound formed by modifying part of a structure of the lithium vanadium phosphate.

2. The charge control apparatus according to claim 1, wherein
the charge control unit includes a first charging mode and a second charging mode, and
the charge termination voltage in the second charging mode is less than or equal to the charge termination voltage in the first charging mode.

3. The charge control apparatus according to claim 2, further comprising:
a temperature sensor configured to detect a temperature of the battery;
a temperature acquiring unit configured to acquire the temperature;
an accepting unit configured to accept a selection of the first charging mode or the second charging mode;
a storage unit configured to store a first voltage setting table in which a temperature referred to in the first charging mode is associated with the charge termination voltage, and a second voltage setting table in which a temperature referred to in the second charging mode is associated with the charge termination voltage; and
a charge termination voltage setting unit configured to refer to the first voltage setting table or the second voltage setting table corresponding to a selected one of the first charging mode or the second charging mode, and to set the charge termination voltage associated with the temperature acquired by the temperature acquiring unit.

4. The charge control apparatus according to claim 3, wherein
the charge termination voltage associated with the highest temperature in the second voltage setting table, is the voltage corresponding to the second state of charge associated with the first maximum value.

5. A movable body comprising:
the battery;
a motor configured to operate by power supplied from the battery;
an internal combustion; and
the charge control apparatus according to claim 1.

6. A charge control method of a battery having a first maximum value, a minimum value, and a second maximum value of an output density, in an output characteristic indicating a relationship between state of charge and the output density of the battery, the minimum value corresponding to a first state of charge that is lower than a second state of charge corresponding to the first maximum value, and the second maximum value corresponding to a third state of charge that is lower than the first state of charge to which the minimum value corresponds, wherein each state of charge expresses a ratio of an amount of charged electricity to a rated electricity amount of the battery the charge control method comprising:
  setting a charge termination voltage of the battery in a range between a voltage corresponding to the second state of charge associated with the first maximum value and a full charge voltage; and
  stopping charging the battery when a voltage of the battery reaches the charge termination voltage;
  wherein a material of an electrode of the battery includes a lithium vanadium phosphate having $Li_3V_2(PO_4)_3$ as a basic skeleton or an analogous compound formed by modifying part of a structure of the lithium vanadium phosphate.

* * * * *